United States Patent [19]

Sudler

[11] Patent Number: 4,680,514
[45] Date of Patent: Jul. 14, 1987

[54] MOTOR

[75] Inventor: Roland Sudler, Frankfurt am Main, Fed. Rep. of Germany

[73] Assignee: VDO Adolf Schindling AG, Frankfurt am Main, Fed. Rep. of Germany

[21] Appl. No.: 734,437

[22] Filed: May 16, 1985

[30] Foreign Application Priority Data

May 23, 1984 [DE] Fed. Rep. of Germany ....... 3419100

[51] Int. Cl.$^4$ ............................................. H02K 59/02
[52] U.S. Cl. .................................... 318/318; 318/138; 318/160; 318/696; 368/159; 368/160
[58] Field of Search ............... 318/138, 257, 244, 314, 318/318, 316, 317, 414, 415, 416, 624, 417, 437, 439, 606, 607, 608, 746, 747, 748, 781, 696; 368/157, 155, 160, 156; 310/40 MM, 49 R; 369/202, 159

[56] References Cited

U.S. PATENT DOCUMENTS

| 3,555,810 | 1/1971 | Meitinger | 368/159 X |
| 3,566,600 | 3/1971 | Yoshimura et al. | 368/157 |
| 3,616,638 | 3/1970 | Bennett et al. | 368/159 |
| 3,716,734 | 2/1973 | Fam | 318/781 X |
| 3,842,586 | 10/1974 | Sharyapov et al. | 368/218 |
| 3,937,003 | 2/1976 | Busch et al. | 368/159 |
| 4,032,827 | 6/1977 | Dobratz et al. | 368/159 X |
| 4,091,316 | 5/1978 | Friedman | 318/696 |
| 4,150,536 | 4/1979 | Nakajima et al. | 368/155 |
| 4,241,434 | 12/1980 | Shida et al. | 318/138 X |
| 4,242,611 | 12/1980 | Douglass | 368/159 X |
| 4,284,940 | 8/1981 | Welburn | 318/696 |
| 4,310,790 | 1/1982 | Mulet-Marquis | 318/608 |
| 4,317,072 | 2/1982 | Goof et al. | 318/439 X |
| 4,371,834 | 2/1983 | Bezard et al. | 318/160 X |
| 4,455,513 | 6/1984 | Fulton et al. | 318/696 |

Primary Examiner—William M. Shoop, Jr.
Assistant Examiner—Shik Luen Paul
Attorney, Agent, or Firm—Martin A. Farber

[57] ABSTRACT

The present invention relates to a motor for driving a clockwork. A rotatably supported rotor 1 has diametrically opposite permanent-magnet poles. A multi-phase coil arrangement is furthermore present to produce a magnetic field which deflects the rotor 1 out of its instantaneous position as a function of control signals present in each case on the coils 3 and 4 of the coil arrangement.

The coil arrangement has a plurality of coils 3 and 4 arranged at an equiangular distance apart, surrounding the rotor 1, which coils can be controlled one after the other by sine voltages which are staggered a given angle apart.

13 Claims, 4 Drawing Figures

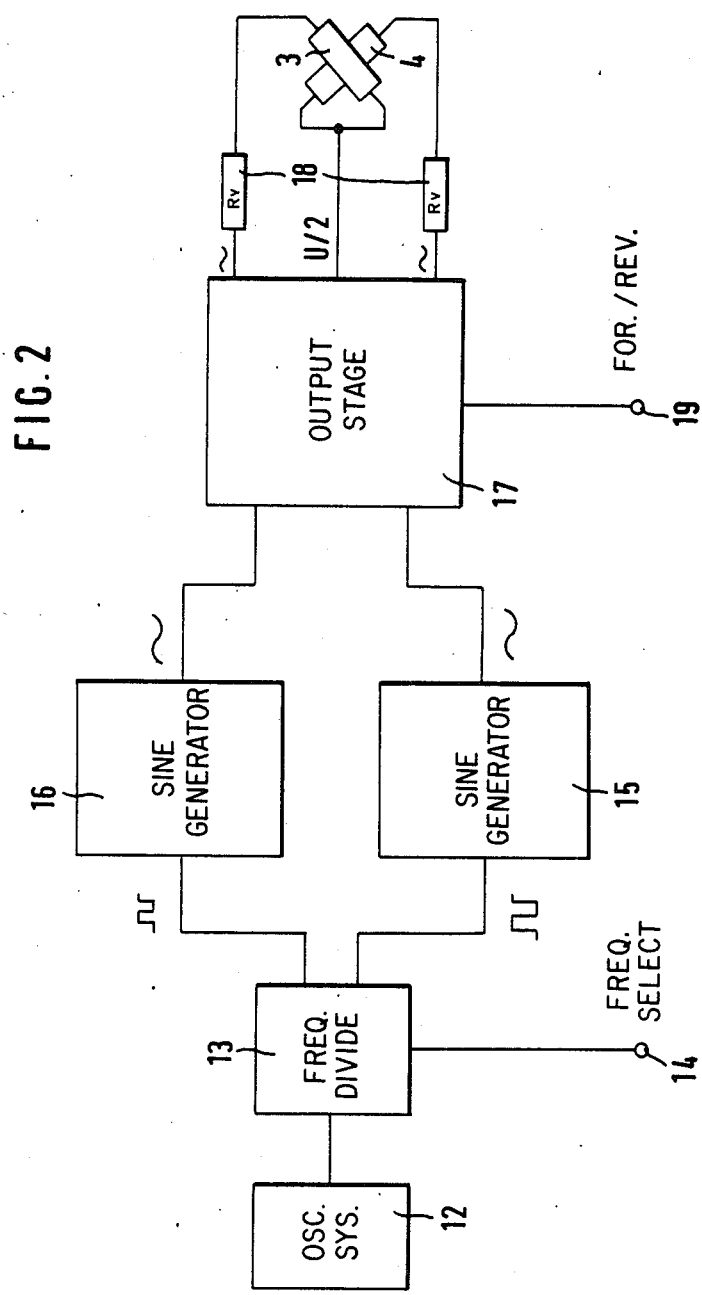

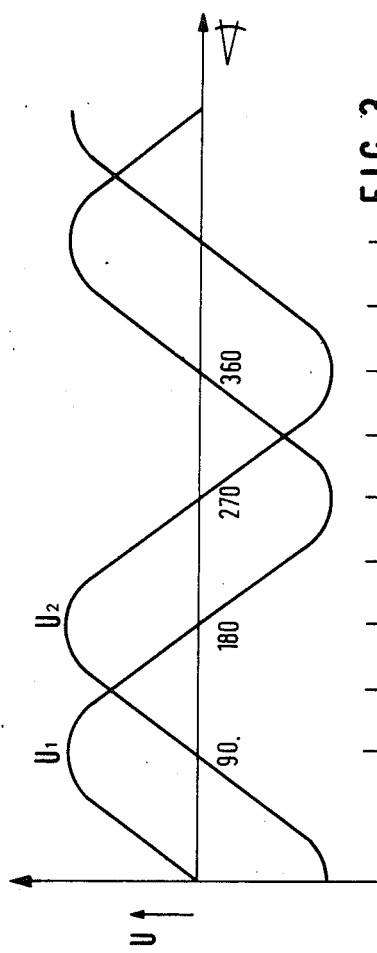

MOTOR

BACKGROUND OF THE INVENTION

The invention relates to a motor, in particular for driving a clockwork, having a rotatably supported rotor which has diametrically opposite permanent-magnet poles, with a multi-phase coil arrangement for the production of a magnetic field which deflects the rotor from its instantaneous position as a function of control signals present in each case on the coils of the coil arrangement.

It is known in such motors to develop the motor as stepping motor and to control it with pulses, the instantaneous current pulse resulting in a specific angular step. This stepwise drive leads upon each step, on the one hand, to the striking of the driven gears of the clockwork and, on the other hand, also to a step-wise displacement of the hands. Both of these factors cause disturbing noises.

It is an object of the invention to create a motor of the above type which while, being of simple construction, permits of operation with little noise.

SUMMARY OF THE INVENTION

According to the invention, the coil arrangement has a plurality of coils (3, 4) which are arranged at an equal angle from each other and surround the rotor (1), the coils being acted on in succession in each case by sine voltages which are a given angle apart. This development leads to a continuous drive so that gears and hands cannot produce impact noises. The hands carry out a uniform, quiet rotary movement.

In one advantageous embodiment of simple construction, the coil arrangement can consist of two coils (3, 4) arranged at right angles to each other and controllable by two sine voltages which are 90° apart.

Without substantial expense or additional space being required, the sequence of the control of the coils (3, 4) can be reversible, so that the clockwork can be driven in both directions of rotation in order to set it.

If the control frequency of the coils (3, 4) is variable, then rapid setting of the clock is obtained without the need for any substantial amount of space or expenses for structural parts. In this connection, the control frequency of the coils (3, 4) can advisedly be increased.

If the rotation shaft (2) of the rotor (1) is the second shaft or the minute shaft of the clockwork then direct drive is obtained and the gearing otherwise customary can be dispensed with. This leads both to a reduction in noise and structural space and to a reduction in the number of structural parts.

In order to control the coils with sine voltages, a sine generator (15, 16) for each coil (3, 4) can be acted on in each case by an oscillatory system (12) by which the corresponding coil (3 or 4) can be controlled with a sine voltage.

In this case, a common frequency divider (13) is preferably arranged in front of the sine generators (15, 16).

If the division ratio of the frequency divider (13) is variable, an increase or reduction of the drive speed and thus an electric setting of the time of the clockwork can be obtained thereby.

An output stage (17) by which the coils (3, 4) can be controlled is arranged behind the sine generators (15, 16). If the sequence of the control signals which can be given off by the output stage (17) is reversible then the setting of the clockwork in both directions of rotation is possible.

Since the motor, which consists of coils and rotor, can be arranged centrally on the dial, this results in a reduction in the required mounting diameter and thus in the required mounting space.

BRIEF DESCRIPTION OF THE DRAWINGS

With the above and other objects and advantages in view, the present invention will become more clearly understood in connection with the detailed description of a preferred embodiment, when considered with the accompanying drawings, of which:

FIG. 2 is a block diagram of the control of the motor of FIG. 1;

FIG. 3 is a control diagram of the voltage plotted against the angle of rotation of the motor of FIG. 1; and FIG. 4 is the control of the coils and position of the rotor in eight control positions.

DETAILED DESCRIPTION OF THE PREFERRED EMBODIMENT

Figure 1:
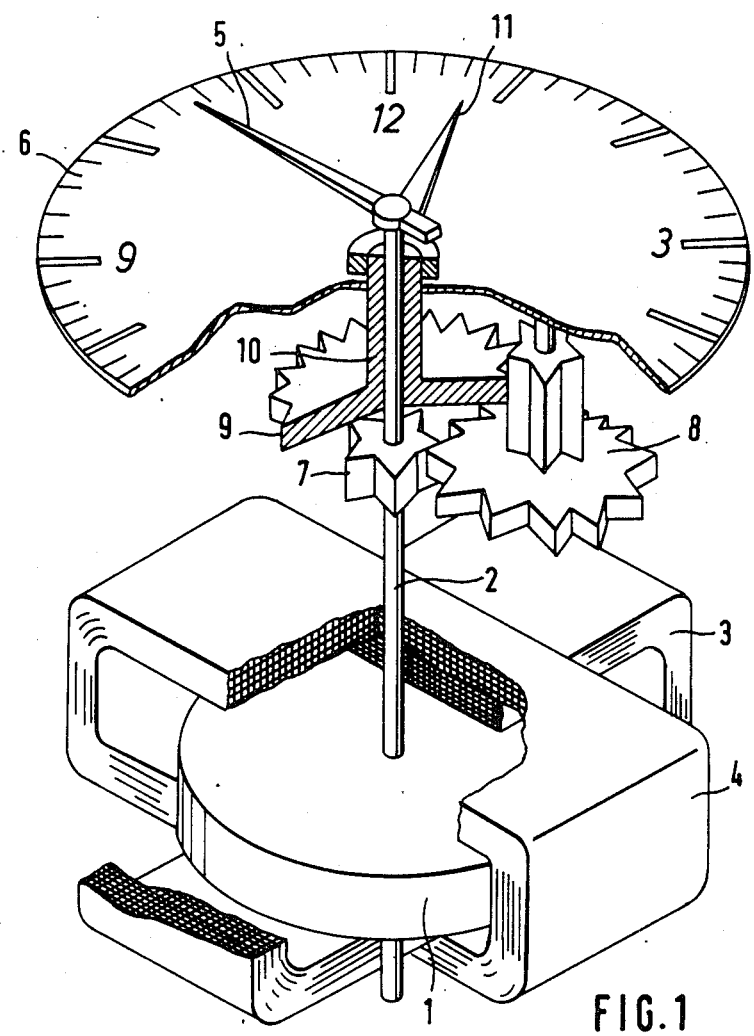
FIG. 1 is a clockwork having a motor.

The motor shown in FIG. 1 comprises a rotatably mounted rotor 1 having a rotation shaft 2, which rotor has diametrically opposite permanent-magnet poles.

The motor furthermore has a coil arrangement which consists of two coils 3, 4 which are arranged at right angles to each other and surround the rotor 1.

At the upper end of the rotation shaft 2 there is fastened a minute hand 5 which is movable over a dial 6.

An hour wheel 9 which has an hour tube 10 which surrounds the rotation shaft 2 can be driven via a drive pinion 7 arranged on the rotation shaft 2 and a minute wheel 8.

To the hour tube 10 there is fastened an hour hand 11 which is also movable over the dial 6.

The control of the motor shown in FIG. 2 has a quartz crystal as oscillatory system 12 by which a frequency divider 13 is applied with a frequency. The division ratio of the frequency divider 13 can be varied by a setting contact 14 so that a frequency of, for instance, 0.01666 Hz in normal operation is increased to a frequency of, for instance, 25 Hz. This corresponds to an increase in speed of rotation of one revolution per minute to a speed of rotation of 1500 revolutions per minute of the rotation shaft 2.

Two sine generators 15 and 16 are acted on with this frequency, each generator producing, as a function of the frequency, a sine voltage which is fed to an output stage 17.

The coils 3 and 4 are acted on via series resistors 18, each coil being acted on by one of the sine voltages produced, these sine voltages being 90° apart.

This is shown diagrammatically in FIG. 3. In this figure, $U_1$ is the sine voltage acting on the coil 3 and $U_2$ the sine voltage acting on the coil 4.

By means of the setting contact 19 of the output stage, the sequence of the control of the coils 3 and 4, and thus the direction of rotation of the hands 5 and 11, is reversible.

The angle-of-rotation positions 1 to 8 indicated in FIG. 3 below the voltage curves correspond to the control positions of the coils 3 and 4 and to the positions of the rotor 1 in FIG. 4.

I claim:

1. In an electric drive, particularly for driving a clockwork, having a rotatably supported rotor which has diametrically opposite permanent-magnet poles, with a multi-phase coil arrangement having at least one coil for the production of a magnetic field which deflects the rotor from its instantaneous position as a function of control signals on said coil of the coil arrangement, the improvement wherein said drive further comprises oscillatory means providing a designated output frequency;

two sine generators driven by said output frequency of said oscillatory means for producing individual sine voltages bearing a designated phase angle relative to each other; and wherein the coil arrangement has a plurality of coils which are arranged at equal angles from each other and surround the rotor, the coils being acted on in succession in each case by sine voltages which are a given angle apart.

2. In an electric drive according to claim 1, the improvement wherein said oscillatory means comprises an oscillatory system and a frequency divider driven by said oscillatory system, said frequency divider providing an output signal for driving each of said sine generators.

3. In an electric drive, particularly for driving a clockwork, having a rotatably supported rotor which has diametrically opposite permanent-magnet poles, with a multi-phase coil arrangement having at least one coil for the production of a magnetic field which deflects the rotor from its instantaneous position as a function of control signals on said coil of the coil arrangement, the improvement wherein said drive further comprises an oscillatory system and a frequency divider driven by said oscillatory system;

two sine generators driven by said output frequency of said frequency divider for producing individual sine voltages bearing a designated phase angle difference relative to each other;

output means being arranged after the sine wave generators for generating control signals for said coils; means for reversing the sequence of control signals given off by the output means;

and wherein the coil arrangement has a plurality of coils which are arranged at equal angles from each other and surround the rotor, the coils being acted on in succession in each case by sine voltages which are a given angle apart.

4. The motor as set forth in claim 3, wherein
said coil arrangement comprises two coils arranged at right angles to each other and controllable by two sine control voltages which are 90° apart.

5. The motor as set forth in claim 4, wherein
the control voltage frequency of the coils is variable.

6. The motor as set forth in claim 5, wherein
the control voltage frequency of the coils is increasable.

7. The motor as set forth in claim 3, wherein
said rotor comprises a rotation shaft, which shaft is second shaft of the clockwork.

8. The motor as set forth in claim 3, wherein
said rotor comprises a rotation shaft, which shaft is the minute shaft of the clockwork.

9. The motor as set forth in claim 3, wherein
the division ratio of the frequency divider is variable.

10. The motor as set forth in claim 3, wherein
said oscillatory system comprises a quartz crystal.

11. The motor as set forth in claim 10, wherein
the output of said oscillatory system is 0.01666 Hz in normal operation.

12. The motor as set forth in claim 10, wherein
the output of said oscillatory system can be adjusted to about 25 Hz.

13. The motor as set forth in claim 7, wherein
the speed of rotation of said rotation shaft can be increased from one revolution per minute to about 1500 revolutions per minute.

* * * * *